Sept. 19, 1961  A. VISCHER, JR  3,000,408
VENDING MACHINE
Filed Oct. 4, 1956  6 Sheets-Sheet 1

INVENTOR.
ALFRED VISCHER Jr.
BY Mason, Kolehmainen,
Rathburn and Wyss.
ATTORNEYS Sept. 19, 1961     A. VISCHER, JR     3,000,408

VENDING MACHINE

Filed Oct. 4, 1956     6 Sheets-Sheet 2

INVENTOR
ALFRED VISCHER Jr.
BY
ATTORNEYS

INVENTOR.
ALFRED VISCHER Jr.
BY
ATTORNEYS

Sept. 19, 1961     A. VISCHER, JR     3,000,408

VENDING MACHINE

Filed Oct. 4, 1956     6 Sheets-Sheet 4

INVENTOR
ALFRED VISCHER Jr.
BY
Mason, Kolehmainen, Rathburn and Wyss
ATTORNEYS

Sept. 19, 1961  A. VISCHER, JR  3,000,408
VENDING MACHINE

Filed Oct. 4, 1956  6 Sheets-Sheet 5

INVENTOR
ALFRED VISCHER JR.

BY

ATTORNEYS

United States Patent Office 3,000,408
Patented Sept. 19, 1961

3,000,408
VENDING MACHINE
Alfred Vischer, Jr., Park Ridge, Ill. (% Vischer Products Co., 2815 W. Roscoe St., Chicago 18, Ill.)
Filed Oct. 4, 1956, Ser. No. 613,950
17 Claims. (Cl. 141—174)

The present invention relates to vending machines, and more particularly to drink dispensing apparatus of the type in which a drinking cup containing a liquid drink is automatically supplied from a vending machine to a customer in response to the actuation by the customer of certain mechanisms on the machine.

Although automatic drink dispensing machines have been in use for many years, two important problems concerning their operation have not as yet been satisfactorily solved. One of these problems concerns the storing of a large number of drinking cups for the selective feeding thereof by simple and reliable apparatus to a drink dispensing nozzle or nozzles in the machine. Generally, in prior art devices a plurality of stacks of cups are stacked on a turret which rotates to move each of the stacks over a delivery chute for selective feeding of the cups to a fill station. Such arrangements, being relatively complex in structure and operation, are highly susceptible to failure and quite expensive to manufacture. The other problem concerns the sanitary filling of the cups with the liquid drink and the feeding of the drink-filled cup to the customer. In order to minmize the manufacturing cost of this portion of prior art machines, most arrangements fill the cup in the presence of the customer, thus necessitating an exposed and, consequently, unsanitary nozzle. Although ultraviolet rays and other means have been used to disinfect such nozzles, there remains much to be desired.

Therefore, a principal object of the present invention is to provide a new and improved vending machine.

Another object of the present invention is to provide new and improved apparatus for storing a large number of drinking cups for selective feeding to a work station.

A further object of the present invention is to provide a new and improved mechanism for enabling the sanitary filling of a drinking cup with a suitable liquid drink and for thereafter feeding the filled cup to a customer in such manner as to prevent contact by the customer with the drink dispensing and other operating parts of the machine.

A still further object of the present invention is to provide a vending machine which cannot be readily rendered inoperative by acts of vandalism and the like.

Briefly, certain of the above and further objects of the present invention are realized in accordance with one phase of the present invention by providing a cup drop mechanism which supports a plurality of stacks of drinking cups above a conical chute and selectively drops the cups into the chute from alternate stacks upon successive operations of the machine, the stacks of cups remaining in a fixed horizontal position at all times.

In accordance with another phase of the present invention, certain other of the above and further objects are realized by providing a revolving platform on which the empty cups are individually placed for transfer to a fill station and thence to a feed station. At the time that the filled cup reaches the feed station, rotation of the platform ceases and the filled cup is pushed onto a delivery shelf at the front of the machine by means of a feed member which reciprocates along a diametric path on the platform. The pushing surfaces of the feed members taper outwardly toward the bottom thereof along a plane substantially parallel to the tangential plane of the side of a cup, thus applying a uniform force to the cup throughout its height. This prevents tipping of the cup during delivery. The platform then rotates through a sufficient angle to position the next empty cup directly beneath a drink dispensing nozzle and stops. When the machine is next operated, the empty cup which is at the fill station is filled with the drink and the platform rotates until the filled cup is at the feed station. The platform then stops and the feed member moves back across the platform and pushes the filled cup onto the delivery shelf.

In accordance with a further phase of the present invention, a pair of upstanding arcuate flanges are provided in diametrically opposed positions on the platform adjacent the reciprocatory path of the feed member, which member is only slightly wider than the cups. These flanges provide doors which conform to the surrounding surfaces of a delivery opening in the front of the machine through which the filled cups are passed as they are pushed onto the delivery shelf, and the doors close over the delivery opening when the platform is in any position other than the feed position. Therefore, when the platform is stopped in the fill position, the delivery opening is completely closed to prevent damage to the machine by acts of vandalism and the like. Also, the pushing surfaces of the feed member, which are on the opposite ends thereof, correspond to the adjacent surfaces of the arcuate flanges or doors as well as conforming to the doorway of the delivery opening, so that when the feed member moves to its extreme position to push a filled cup onto the delivery platform, the delivery opening is completely closed, thus preventing the insertion of a tool or other article into the feed opening to jam the operation of the machine by preventing rotation of the platform. For this same purpose, the platform includes flat upstanding guide flanges disposed on opposite sides of the path of movement of the feed member to provide smooth surfaces or guides along which the feed member reciprocates. Therefore, any article or device which is inserted accidentally or otherwise through the delivery opening and onto the feed path of the platform is pushed out of the machine through the delivery opening by the feed member, the delivery opening thus being closed by the feed member, and the delivery opening remains closed by virtue of the arcuate flanges thereon as the platform rotates to position an empty cup beneath the drink dispensing nozzle. The guide flanges also prevent tipping of the cup as it is pushed along the platform onto the delivery shelf.

The invention, both as to its organization and method of operation, together with further objects and advantages thereof, will best be understood by reference to the following detailed description taken in connection with the accompanying drawings, in which.

Figures 1, 13:
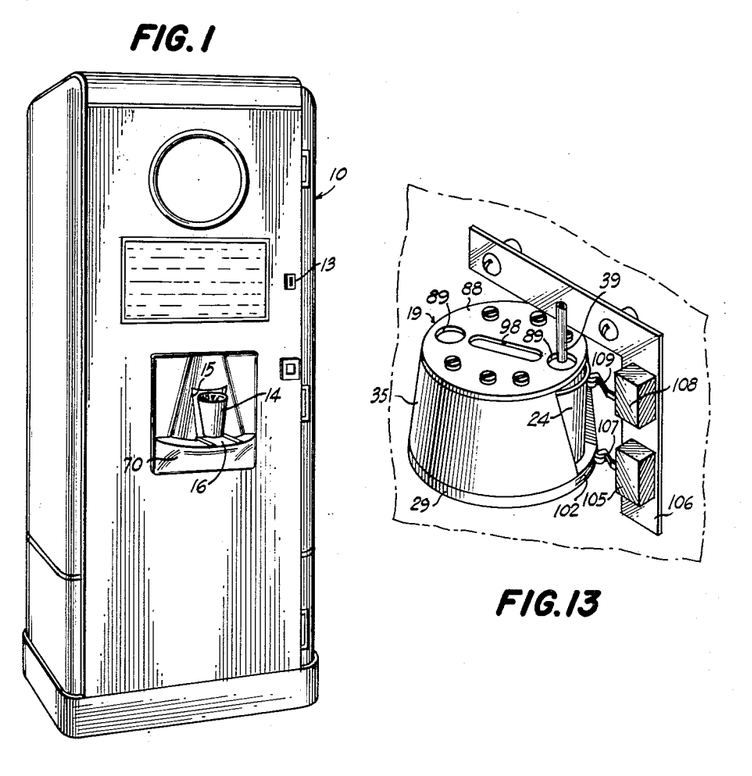
FIG. 1 is a front perspective view of a vending machine embodying certain aspects of the present invention.
FIG. 13 is an isometric view of the article feed mechanism in the fill position.

Referring now to the drawings and particularly to FIG. 1 thereof, there is shown a vending machine 10 comprising a coin drop slot 13 into which a suitable coin or check (not shown) is inserted to initiate the operation of the machine 10 which feeds a drink filled cup 14 through a feed or delivery opening 15 onto a delivery shelf 16.

Figure 2:
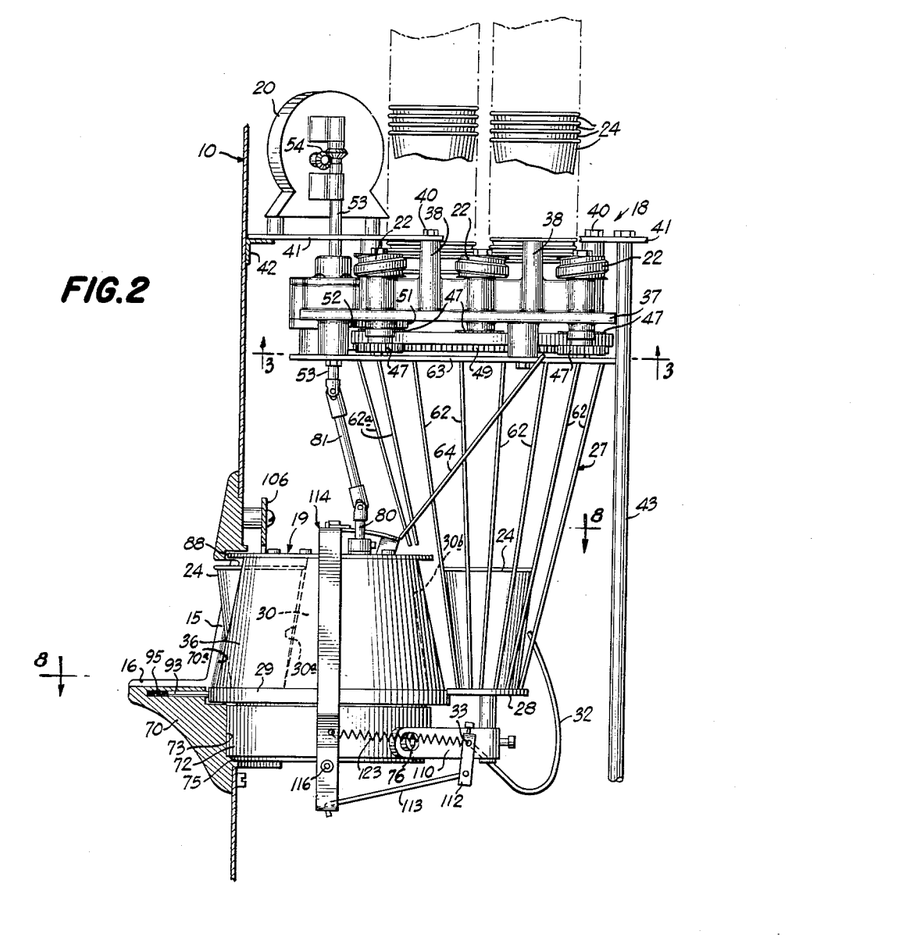
FIG. 2 is a side elevational view partially in section of certain portions of the vending machine of FIG. 1 which embody the present invention.

Referring now to FIG. 2, there is shown a cup drop mechanism 18 and an article feed mechanism 19 which are driven in synchronism with one another by a suitable electric motor and reduction gear box unit 20.

Figure 3:
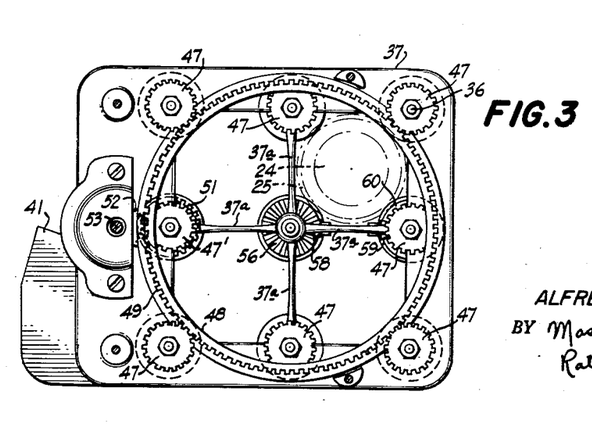
FIG. 3 is a sectional view of the cup dropping mechanism of FIG. 2 taken along the line 3—3 thereof.
Figure 4:
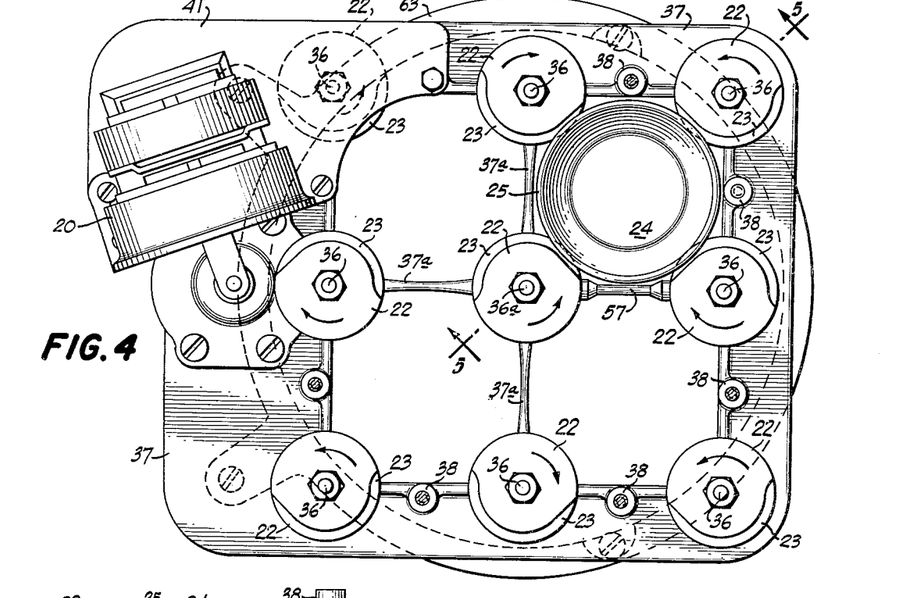
FIG. 4 is a top plan view of the cup dropping mechanism of FIG. 2 with certain parts removed.

As best shown in FIGS. 3 and 4, the cup drop mechanism 18 comprises a plurality of cooperating rotatable dropping wheels 22 each having peripheral screw threaded portions 23 constructed and arranged to receive the upper edges or lips 25 of a plurality of cups 24 and to selectively move the cups 24 downwardly out of their respective stacks. As shown, four stacks of the cups 24 are nested in a square and nine dropping wheels 22 are provided, eight of the wheels 22 being equally spaced along the edges if the square envelope of the four stacks of cups 24 and one of the wheels being located at the center of the square, all of the wheels 22 being operatively disposed in the same horizontal plane. As best shown in FIG. 4, this arrangement of the wheels 22 provides a nest of four feed channels from which the cups 24 may be selectively dropped from alternate ones of the plurality of stacks respectively positioned in each of these channels by continuous rotation of the wheels 22.

For each operation of the machine 10 which, for example, may be initiated by inserting a coin in the slot 13, the motor unit 20 is energized for a sufficient length of time for one of the cups 24 to be dropped into a conical chute 27 for delivery to a cup loading platform 28. During the time that the wheels 22 have been turning so as to drop one of the cups 24 into the chute 27, a rotatably mounted conveyor platform 29 on which an empty cup was previously placed has moved the cup from the liquid drink feeding station, at which the cup was filled, to a feed position which is directly opposite the delivery opening 15 in the front of the machine 10. When the filled cup has been moved to the feed position opposite the opening 15, a feed member 30, which is mounted for reciprocal movement along a diameter of the platform 29 and has pushing surfaces 30a and 30b on opposite sides thereof is moved toward the opening 15 to slide the filled cup 14 onto the shelf 16. As the feed member 30 is pushing the filled cup 14 onto the delivery shelf 16, a finger 32 is pivoted counterclockwise, as viewed in FIG. 2, about an integral pintle portion 33 to push the empty cup from the loading platform 28 onto the platform 29 directly behind the feed member 30. After the feed member 30 has moved to the extremity of its stroke toward the opening 15 to push the filled cup 14 completely onto the shelf 16 and an empty cup 24 has been placed on the platform 29 by the finger 32, the finger 32 is retracted and the platform 29 rotates through a predetermined angle such as, for example, 120 degrees to move the empty cup 24 under a liquid dispensing nozzle 39 (FIG. 13) and at the same time to position one of a pair of conically shaped arcuate flanges or doors 35 and 36 opposite the opening 15. The motor 20 is then deenergized and the platform 29 stops. Consequently, the delivery opening 15 is closed and an empty cup is in the fill station under the drink dispensing nozzle 39. When operation of the machine is once more initiated, liquid from the nozzle 39 fills the cup and the platform 29 rotates until the filled cup is opposite the opening 15. During the movement of the filled cup from the fill station to the feed station, a cup 24 is dropped by the mechanism 18 onto the platform 28. Therefore, when the filled cup reaches the feed station opposite the delivery opening 15, the feed member 30 is moved toward the opening 15 to push the filled cup onto the shelf 16 and the finger 32 pushes the empty cup from the platform 28 onto the conveyor platform 29. The platform 29 then rotates through the necessary angle to position the empty cup 24 under the feed nozzle 39. This latter position is illustrated in FIG. 13.

Considering the cup drop mechanism 18 in greater detail, the side and corner wheels 22 are respectively connected as, for example, by set screws to a plurality of vertically disposed shafts 36 which are suitably journaled in a rectangular supporting frame 37. A series of webs 37a are provided on the frame 37 for supporting a shaft 36a on which the central wheel 22 is mounted. The frame 37 may be a casting having a plurality of upstanding recessed bosses 38 in which are received a plurality of headed bolts 40 which fasten the member 37 to a suitable supporting plate 41. The plate 41 is attached by a bracket 42 to the front of the machine 10, and the rear end of the plate 41 is supported on a plurality of legs 43 which extend up from the bottom of the machine.

For the purpose of rotating the side and corner wheels 22, a plurality of spur gears 47 are respectively attached to the shafts 36 and all but one of the gears 47, that one being designated 47', are driven by a multiple ring gear 48. The gear 48 has externally threaded portion 49 engaging the gears 47 which are associated with the four corner wheels 22 and an internally threaded portion 50 engaging the gears 47 which are associated with the four side wheels 22. The ring gear 48 is driven from the motor unit 20 through the medium of a drive gear assembly which includes a spur gear 51, best shown in FIG. 3, a mating spur gear 52 on a drive shaft 53, and a set of bevel gears 54, FIG. 2, which connect the drive shaft 53 to the output shaft of the motor unit 20. When, therefore, the motor unit 20 is energized, the gear 51 is rotated to drive its associated shaft 36 and thus to drive the ring gear 48. The shaft 36a of the center wheel 22, is provided with a bevel gear 56 (FIG. 3) and is driven from one of the shafts 36 through a shaft 57 having bevel gears 58 and 59 on its opposite ends which respectively mate with the gear 56 and a bevel gear 60 on the respective shaft 36. A shaft 36 which is associated with one of the side wheels 22 is selected for driving the center wheel 22 so that the shaft 57 does not interfere with the dropping of the cups 24. It may thus be seen that the ring gear 48 acts as an idler to cause all of the wheels 22 to rotate in synchronism.

Figure 5:
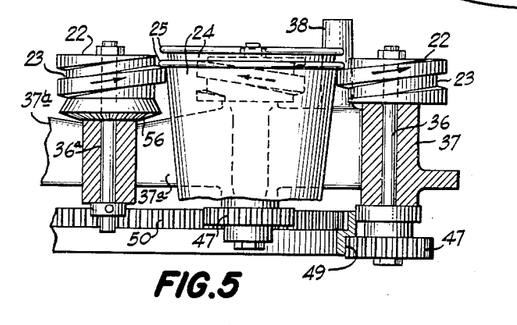
FIG. 5 is a fragmentary view of a portion of the cup dropping mechanism taken along the line 5—5 of FIG. 4.
Figure 6:
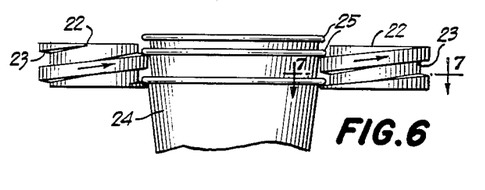
FIG. 6 is a view similar to FIG. 5 showing certain parts of the cup dropping mechanism in a different operating position.
Figure 7:
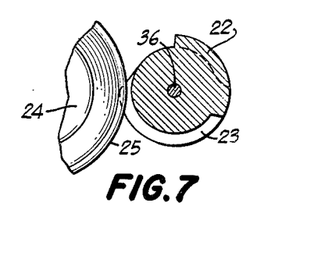
FIG. 7 is a partial sectional view of the apparatus shown in FIG. 6 taken along the line 7—7 thereof.
Figure 8:
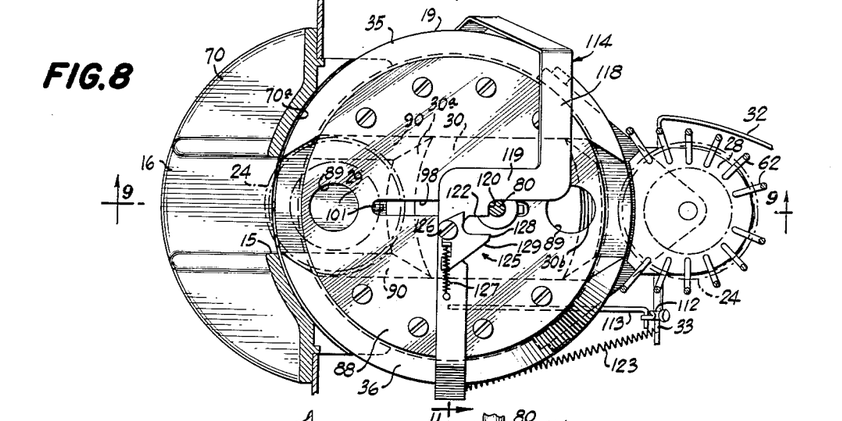
FIG. 8 is a sectional view of the article feed mechanism taken along the line 8—8 of FIG. 2.

Considering the operation of the cup drop mechanism 18, let it be assumed that the cup dropping wheels 22 are in the positions shown in FIG. 4, so that, as best shown in FIG. 5, the four dropping wheels 22 which are associated with the stack appearing in the upper right-hand corner of FIG. 4 have just dropped the bottom cup. It will also be apparent from FIG. 5 that as these same wheels rotate through another 360 degrees the lowermost cup in the associated stack will be separated from the next adjacent cup in the manner shown in FIGS. 6 and 7 and dropped into the chute 27. The wheels 22 which are associated with each of the other stacks operate in this same manner and are so oriented on their respective shafts 36 that after each 90 degrees of rotation of the wheels 22, the four wheels which are associated with some one of the stacks are so positioned as to drop the bottom cup from their stack. The cups 24 are thus successively dropped from alternate ones of the four stacks, one cup being dropped for each one-quarter turn of the wheels 22. For example, when the wheels 22 are rotated through 90 degrees from the position shown in FIG. 4 in the directions indicated by the arrows, the four wheels 22 associated with the stack shown in the upper left-hand corner of the device, as viewed in FIG. 4, are positioned to drop a cup. During the next 90 degrees of rotation of the wheels 22, a cup is dropped from the stack shown in the lower left-hand corner of FIG. 4, and so on. Therefore, for each operation of the machine 10 the wheels 22 must rotate through 90 degrees, such movement being so timed with respect to the operation of the article feed mechanism that a cup is dropped onto the platform 28 only when the finger 32 is out of the chute 27, otherwise the finger 32 might interfere with the proper positioning of the cup on the platform 28.

The delivery chute 27 consists of a plurality of rods 62 which hang from an annular plate 63 mounted on the bottom of the frame 37 in concentricity with the ring gear 48. The rods 62 are disposed along elements of an inverted cone and terminate at the periphery of the loading platform 28 to which they are attached. Certain ones of the rods, designated 62a, are shorter than the others because of the location of the article feed mechanism 19 and are held in their proper positions by a bail 64 which depends from the plate 63. As best shown in FIG. 2, the lower portion of the chute 27 conforms to the shape of the cups 24 so that when the cups are dropped, they alight and stand upright on the loading platform 28.

Considering the article feed mechanism 19 in greater detail and referring to FIGS. 2 and 5–12, it may be seen that the upper surface of the conveyor platform 29 is rotatable in the plane of the delivery shelf 16. The shelf 16 may be part of a unitary member which has a concavo-convex section 70 which provides a doorway for the delivery opening 15 and which extends diagonally upward from the shelf 16 to provide an inner surface 70a which substantially conforms to the outer surfaces of the flanges 35 and 36 and the pushing surfaces 30a and 30b of the feed member 30. The platform 29 is mounted for rotation on an inner race 71 of a suitable ball bearing assembly including an annular outer race 72. A portion of the external periphery of the race 72 fits in an arcuate rabbet 73 in the shelf member 16 and the internal periphery of the race 72 fits in an annular rabbet 74 in a base member 75. The shelf 16, the race 72, and the base member 75 are suitably secured together by a plurality of machine screws 76.

Figure 9:
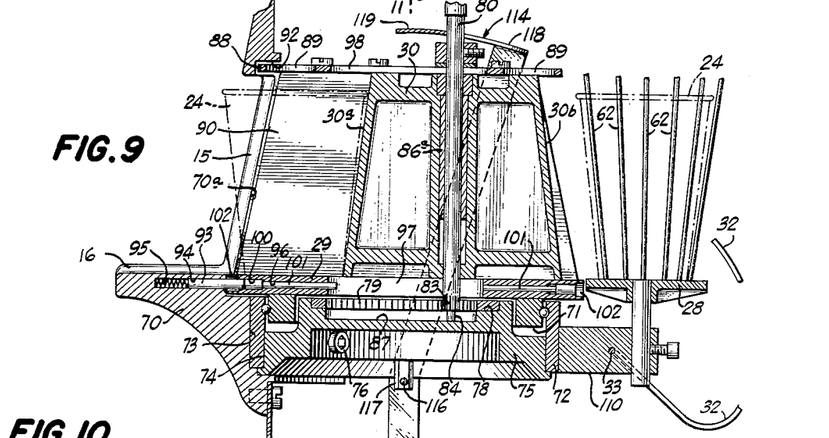
FIG. 9 is a cross-sectional view of the feed mechanism of FIG. 8 taken along the line 9—9 thereof.
Figure 10:
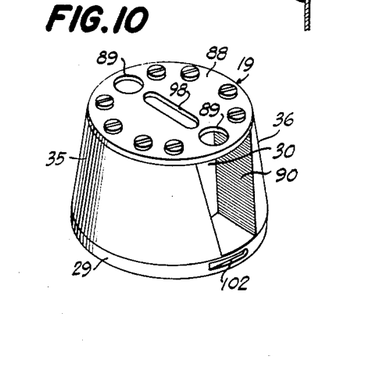
FIG. 10 is an isometric view of a portion of the article feed mechanism.
Figure 11:
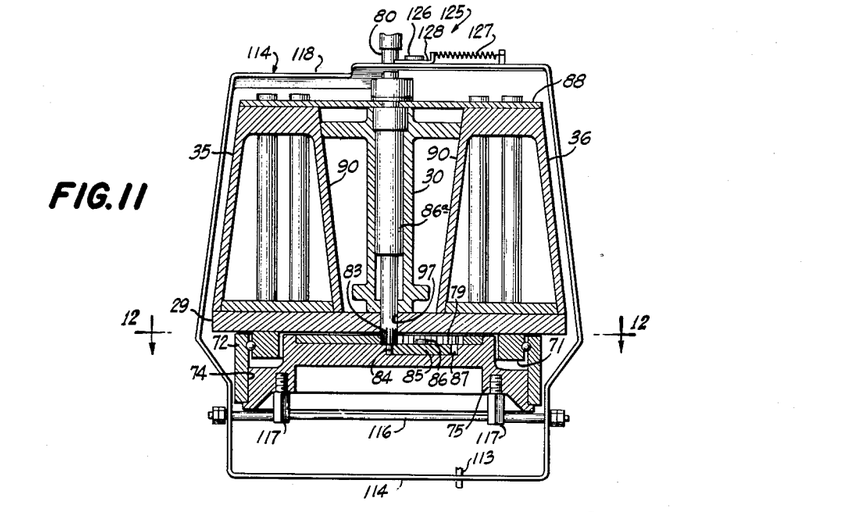
FIG. 11 is a cross-sectional view of the portion of the article feed mechanism taken along the line 11—11 in FIG. 8.
Figure 12:
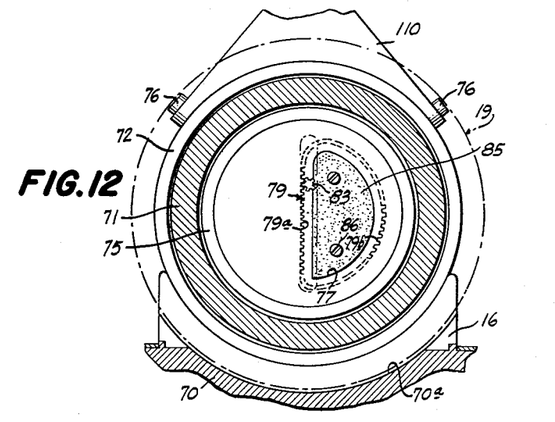
FIG. 12 is a cross-sectional view of the apparatus of FIG. 11 taken along the line 12—12 thereof, assuming the entire structure to be shown in FIG. 11.

In order to rotate the platform 29 and reciprocate the feed member 30 in a predetermined timed sequence, a drive spindle 80 is connected through a universal connection 81 to the drive shaft 53 and includes a pinion gear 83 on the lower end thereof which mates with an irregularly shaped internal gear 79 mounted in the base member 75. As best shown in FIG. 12, a cam 85 having a contour conforming to the shape of the gear 83 is secured by a plurality of screws 86 in a recess 87 in the top of the base member 75 thereby to engage the lower portion 84 of the spindle 80 to maintain the pinion 83 in engagement with the gear 79. As shown in FIG. 9, the gear 79 may be cut in a circular plate and mounted in a counterbore 78 surrounding the recess 87 in the base 75.

The platform 29 and a top plate 88 on the feeding mechanism 19 are provided with respective slots 97 and 98 which are parallel to the feed path on the platform 29 and through which the spindle 80 extends. Moreover, the gear 78 has a linear portion 79a lying in the plane of the slots 97 and 98 and an arcuate portion 79b connecting the ends of the portion 79a. Therefore, as the spindle 80 travels along the arcuate portion 79b, the platform 29 and attached parts are rotated by the spindle 80 through one hundred and eighty degrees and as the spindle 80 travels along the linear portion 79a it moves freely with respect to the platform 29 and moves the feed member 30, in which it is journaled, toward the opening 15. The feed member 30 may be a casting with a bushing 86a provided in a central bore thereof to permit the necessary relative rotation between the spindle 80 and the feed member 30. The front and rear cup pushing surfaces 30a and 30b are arcuate segments of a cone and correspond to the external surfaces of the doors 35 and 36. Consequently, when the feed member 30 is in either of its extreme positions toward the front of the machine 10, it conforms to the doorway of the opening 15 and completely closes the opening 15.

The doors 35 and 36 may be identical castings, each including an internal wall or guide 90 which is offset from the vertical to provide a guide path which corresponds to the vertical cross-section of the cups 24. A circular plate 88 which rides in an arcuate rabbet 92 above the opening 15 provides the top for the feed mechanism 19. The plate 88 has a pair of openings 89 near the opposite ends of the feed path through which the drink is poured from the nozzle 39 into the cups 24.

In order to lock the platform 29 in the delivery position during the time that a filled cup is being pushed onto the shelf 16 thus preventing undesired rotation of the platform 29 from outside of the machine 10, a locking pin 93 is slidably disposed in a recess 94 provided beneath the center of the shelf 16 and a coil spring 95 biases the pin 93 toward the platform 29. A hole 96 having a counterbore 100 is provided in the edge of the platform 29 directly beneath the center line of the path of movement of the member 30 and a pin 101 of similar shape is slidably positioned within the hole 96. The pin 101 extends into the end of the slot 97 in the platform 29 so that as the spindle 80 approaches the end of the linear portion 79a of the gear 79, the filled cup thus being pushed onto the delivery shelf 16, the spindle 80 engages the inner end of the pin 101 and forces it against the locking pin 93 thereby to push the locking pin 93 out of the counterbore 100 into a tapered camming groove 102 provided in the edge of the platform 29. A similar pin 101 and associated parts are provided in the opposite edge of the platform 29, this being necessary since a drink is delivered for each half revolution of the platform 29. Since the platform 29 rotates counterclockwise as viewed from the top thereof, the grooves 102 taper outwardly toward the periphery of the platform 29 in a clockwise direction.

Considering now the operation of the delivery mechanism 19, let it be assumed that the platform 29 is in the fill position with an empty cup located beneath the liquid drink dispensing nozzle 39. When a cycle of operation is initiated by inserting a coin into the slot 13, the platform 29 remains stationary until the cup is filled. After the cup is filled, the motor unit 20 is energized and rotates the spindle 80 causing it to traverse an arcuate path as determined by the gear 79. The spindle 80 thus presses on the sides of the slots 97 and 98 to cause rotation of the platform 29. This rotation of the platform 29 continues until the pinion portion 83 of the spindle 80 reaches the linear portion 79a of the gear 79, at which time the platform 29 is in the feed position with the filled cup opposite the opening 15. The spindle 80 commences to move parallel with the slots 97 and 98, rotation of the platform 29 terminates and the feed member 30 moves across the platform 29 toward the opening 15. Moreover, the locking pin 93 has snapped into the hole 96 to lock the platform 29 in the delivery or feed position. Continued rotation of the spindle 80 causes it to move directly along the slots 97 and 98 toward the front of the machine 10, which moves the feed member to its extreme forward position which pushes the filled cup onto the delivery shelf 16. As the feed member 30 is approaching the end of its stroke, the spindle 80 engages the pin 101 to push the locking pin 93 out of the counterbore 100 into the camming groove 102. This unlocks the platform 29 so that as the pinion 83 begins to traverse the curved portion 79b of the gear 79 the platform 29 rotates and the locking pin 93 is lifted by the tapered bottom of the groove 102 onto the edge of the platform 29. Continued rotation of the spindle 80 rotates the platform 29 until it is once more in the fill position with an empty cup under the nozzle 39, at which time a switch 105 (FIG. 13) disposed at the fill position is actuated to deenergize the motor unit 20 and to stop the platform 29 with one of the doors 35 or 36 disposed opposite the delivery opening 15. As shown, the switch 105 is mounted on an angle bracket 106 and has an actuating arm 107 which is biased toward the edge of the platform 29 and which actuates the switch as it rides in the groove 102. A similar switch 108 having an actuating arm 109 is mounted on the bracket 106 directly above the switch 105 for preventing the initiation of the operation of the machine 10 if a cup is not in the fill station.

In order to operate the finger 32 in timed sequence with the delivery mechanism 19 and the cup drop mechanism 18, so that a cup is placed on the platform 29 as the filled cup is delivered, the finger 32 is actuated by the spindle 80 as it moves along the slots 97 and 98 toward the opening 15. While the spindle 80 traverses an arcuate path, the finger 32 remains in a retracted, inactive position, during which time a cup may be dropped onto the platform 28, but when the spindle 80 travels directly along the slots 97 and 98 toward the opening 15, the finger 32 pivots counterclockwise as viewed in FIG. 2. As previously described, a cup 24 is dropped onto the loading platform 28 while the finger 32 is retracted, and the cup 24 is pushed onto the platform 29 by the finger 32 as it moves through the chute 27.

Referring to FIG. 2, it may be seen that the finger 32 is pivotally mounted about an integral pintle portion 33 which is journaled in a triangular support plate 110. The plate 110 is attached to the base member 75 by means of a plurality of the screws 76 which secure it through the outer race 72 to the base member 75. The pintle portion 33 of the finger 32 is connected through a linkage comprising a pair of connecting rods 112 and 113 to the bottom cross-member of a cradle 114. The cradle 114 surrounds the feed mechanism 19 and has an upper cross member 118 having an offset portion 119 slidably engaging the spindle 80. As the spindle 80 is moved along the slots 97 and 98 to move the feed member 30 toward the front of the machine, it engages a shoulder 120 on the upper cross member 118 to pivot the cradle 114 about the pintle 116 thereby to rotate the finger 32 counterclockwise (FIG. 2) and move a cup 24 onto the platform 29. When the spindle 80 reaches the extremity of its stroke toward the front of the machine 10, it begins to move counterclockwise, as viewed in FIG. 8, thereby to rotate the platform 29. At this time the finger 32 extends partially within the passageway between the doors 35 and 36 and must be quickly retracted to permit rotation of the platform 29. Accordingly, the cradle is provided with a steep cam portion 122 which permits the cradle 114 to spring back a predetermined amount under the force of a spring 123 when the spindle 80 moves off the shoulder 120.

Further arcuate movement of the spindle 80 enables the finger 32 to be fully retracted from the delivery chute 27. After the finger 32 is fully retracted a cup 24 is dropped. In order to facilitate the return of the spindle 80 to the shoulder 120, a latch 125 is pivotally mounted on a pintle 126 and resiliently biased by a spring 127 to the position shown in FIG. 8. As the spindle 80 moves away from the surface 122, it rotates the latch 125 clockwise (FIG. 8) until the spindle 80 passes over a shoulder 128 on the latch 125, at which time the latch 125 snaps back to its normal position and thereafter during the arcuate movement of the spindle 80, the spindle 80 rides up a tapered surface 129 on the latch 125 thereby to be lifted onto the shoulder 120.

Figure 14:
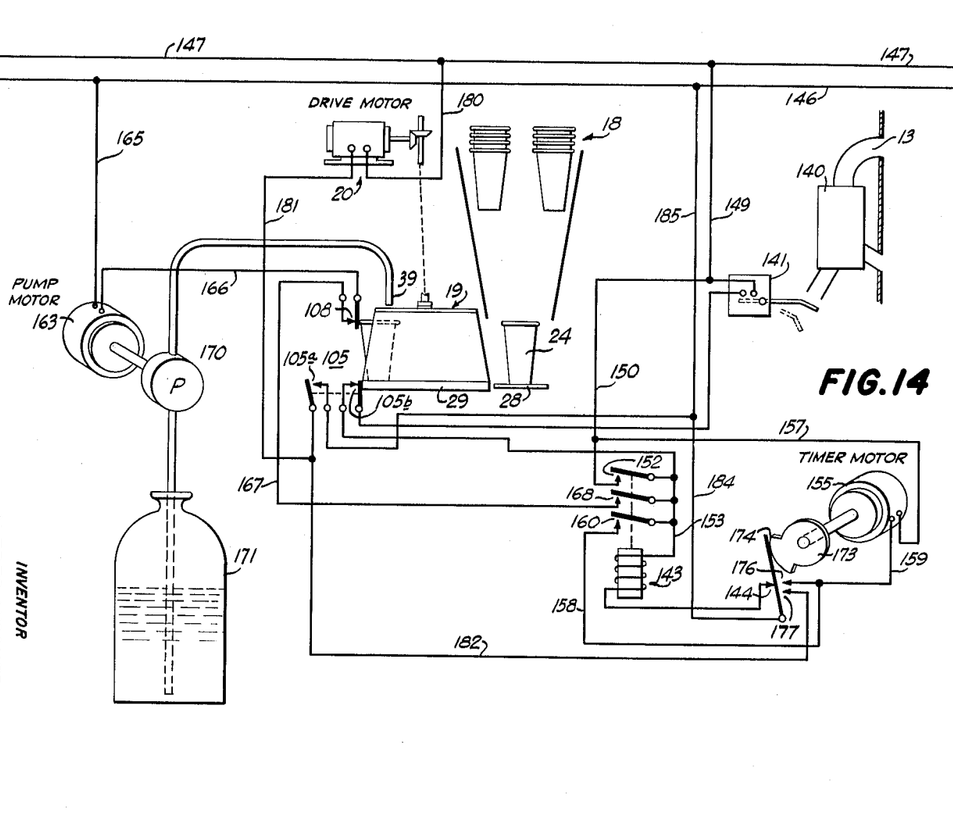
FIG. 14 is a schematic diagram of the control circuit for the vending machine of FIG. 1, showing certain switches and associated mechanism for controlling the automatic operation of the vending machine.

Referring now to FIG. 14, wherein is shown a schematic circuit diagram of the control circuit of the present invention which causes the various parts of the machine 10 to operate in the manner heretofore described. When a customer desires to obtain a drink from the machine 10, he inserts a proper coin or check into the slot 13 so that it drops through a conventional coin chute mechanism 140 momentarily to close a normally open switch 141. The switch 141 is serially connected with the coil of a relay 143 and a switch 144 across a pair of power lines 146 and 147. Since the switch 144 is closed at the termination of the preceding operating cycle of the machine 10, when the switch 141 momentarily closes, the relay 143 is operated. The switch 141 then opens but the relay 143 remains operated through an alternate energization circuit which includes a conductor 149, connected to the power line 147, a conductor 150, a set of normally open contacts 152 on the relay 143 and a conductor 153, which is connected to the coil of the relay 143, the connection between the relay 143 and the power line 146 remaining the same.

When the relay 143 operates, a timer motor 155 is energized from across the power lines 146 and 147 through the circuit comprising the conductor 149, the conductor 150, a conductor 157, which is interconnected between the conductor 150 and one terminal of the timer motor 155, a conductor 159 connected to the other terminal of the motor 155, a conductor 158, a set of normally open contacts 160 on the relay 143, the conductor 153, the coil of the relay 143 and its return circuit through the switch 144 to the power line 146. Simultaneously with the energization of the timer motor 155, a feed pump motor 163 is connected across the power lines 146 and 147 through the series circuit comprising a conductor 165 connected between the power line 146 and one terminal of the motor 163, a conductor 166 connected to the other terminal of the motor 163, the cup feeler switch 108 which is closed by virtue of the fact that a cup 24 is in the full station on the platform 29, a conductor 167, a set of normally open contacts 168 and the contacts 152 on the relay 143 and the conductors 150 and 149 to the power line 147. The motor 163 drives a suitable pump 170 which pumps a liquid drink from a drink supply 171 to the nozzle 39 to fill the cup at the fill station. It may thus be seen that the liquid drink is pumped into a cup as long as the relay 143 is operated. When, however, the relay 143 is deenergized the pumping stops.

In order to deenergize the motor 163 when the cup is filled, the timer motor 155 drives a cam 173 having an arcuate switch actuating segment 174 which causes the switch 144 to open after a predetermined time, the predetermined time being that time required for the pump 170 to fill a cup. Since the switch 144 is in the return path of the relay 143, being serially connected between the power line 146 and one side of the coil of the relay 143, when the switch 144 opens, the relay 143 is released thereby opening the contacts 152, 160 and 168. At the time that the switch 144 is opened to release the relay 143, a pair of switches 176 and 177 are closed to provide a return path for the timer motor 155 to the power line 146 so that the timer motor 155 remains energized after the relay 143 is released and continues to be energized until the arcuate segment 174 returns to the position illustrated in the drawing, at which time the switches 176 and 177 are opened and the switch 144 is closed. Because, however, the coin operated switch 144 is open, the timer motor 155 remains deenergized.

At the time that the switch 177 is first closed, the motor unit 20 which drives the cup drop mechanism 18 and the feed mechanism 19 is energized to commence rotation of the platform 29. The energization circuit for the motor unit 20 comprises the conductor 180, which is connected between the power line 147 and one terminal of the motor 20, a conductor 181, a conductor 182, the switch 177, a conductor 184 and a conductor 185 which is connnected to the power line 146.

During the time required for the cam 173 to rotate through a sufficient angle for the arcuate segment 174 to again actuate the switches 144, 176 and 177, a section 105a of the switch 105 is closed by virtue of the rotation of the platform 29 which moves the groove 102 out of engagement with the switch actuating arm 107. Therefore, the motor unit 20 is serially connected with the switch section 105a across the power lines 146 and 147. Accordingly, when the switch 177 is opened, the motor unit 20 remains energized and continues to rotate the platform 29 and operate the cup drop mechanism 18. The motor unit 20 thus remains energized to drive the feed mechanism 19 until a filled cup 24 has been delivered to the customer and an empty cup has been placed in the fill station under the nozzle 39, at which time the switch 105 is operated to open the contacts 105a. Since the switch 177 has previously been opened, opening of the switch section 105a deenergizes the motor unit 20 and the machine 10 is ready for the next operation which is commenced by inserting a coin into the slot 13 momentarily to operate the switch 251.

The switch section 105b is provided so that the insertion of a coin into the slot 13 will not function to operate the relay 143 unless the feed mechanism 19 is in the fill position. Otherwise, improper operation of the machine 10 would result.

While the present invention has been described in connection with particular embodiments thereof, it will be understood that those skilled in the art may make many changes and modifications without departing from the true spirit and scope of this invention as defined in the appended claims.

What is claimed as new and is desired to be secured by Letters Patent of the United States is:

1. A vending machine comprising cup drop means for supporting a plurality of stacks of cups and for selectively removing said cups from alternate ones of said stacks, means for positioning each removed cup at a fill station, means responsive to single actuation of a start mechanism for causing the cup at the fill station to be filled, then to move the filled cup from the fill station to a position opposite a delivery opening, then to feed the filled cup through the delivery opening and cause said cup drop means to remove a cup from one of said stacks and to supply it to said second-mentioned means, then to move the latest removed cup to the fill station and obstruct said delivery opening, and then to deenergize the machine in the last condition of operation, whereby when operation of the machine is again initiated, the operating cycle commences with the filling of the cup which is at the fill station.

2. A vending machine comprising means for supporting a plurality of stacks of cups and for selectively removing said cups from alternate ones of said stacks, transfer means for moving each removed cup to a fill station, coin operated means for initiating operation of the machine which causes the cup at the fill station to be filled and said transfer means being then operative to move the filled cup to a delivery opening, then to be fed through said delivery opening and means operative simultaneously with the feeding of a cup through said delivery opening to cause said first-mentioned means to remove a cup from one of said stacks and to supply it to said transfer means, said transfer means then operative to move the latest removed cup to the fill station while simultaneously obstructing said delivery opening, and means then operative to deenergize the machine in the last condition of operation, whereby when operation of the machine is again initiated the operating cycle commences with the filling of the cup which is at the fill station.

3. In a dispensing machine of the type having a delivery opening through which an article is supplied to the user of the machine, the combination of a circular platform rotatably mounted in said machine opposite said opening, a feed member mounted for reciprocation along a diameter of said platform, means for placing an article on said platform along the path of movement of said feed member, and means for rotating said platform to a delivery position, at which position said path of movement is aligned with said opening and said article is disposed between said opening and said feed member, and means responsive to said platform being in a delivery position for stopping the rotation of said platform and moving said feed member to feed said article through said opening.

4. In a vending machine, a platform rotatable about a vertical axis, a pair of doors mounted on said platform on diametrically opposite sides thereof, a feed member mounted for reciprocal movement along a path on said platform substantially parallel to the line of demarcation of said doors, and means for placing an empty cup on said path, for rotating said platform to move said empty cup to a fill station at which it is filled, then to move the empty cup to a position between said feed member and a delivery opening, then to stop said platform and move said feed member toward said opening to push the filled cup therethrough while simultaneously placing an empty cup on said platform behind said feed member, then to rotate said platform until one of said doors is over said delivery opening and the empty cup is at the fill station, and then to stop the rotation of said platform and said feed member.

5. A vending machine comprising a cup dropping mechanism, a feed mechanism, means defining a delivery opening adjacent said feed mechanism, a loading platform disposed adjacent to said feed mechanism, below said cup dropping mechanism, a delivery chute operatively interposed between said cup dropping mechanism and said loading platform, and means for operating said mechanisms to cause said cup dropping mechanism to drop a cup into said chute for delivery to said loading platform, to cause said cup to be moved from said loading platform to said feed mechanism, to cause said feed mechanism to move said cup to a fill station at which station said cup is filled with a liquid drink, and to cause said feed mechanism to move the filled cup to said opening.

6. Cup dispensing apparatus comprising a cup delivery chute, a plurality of peripherally threaded wheels cooperatively arranged in a rectangle for supporting a plurality of stacks of cups in a rectangle and for selectively dropping the cups from said stacks, at least one of said wheels being common to at least two of said stacks, the threads on said wheels operatively engaging the lips of the lower ones of said cups in said stacks, and a conical delivery chute disposed below said stacks for directing the dropped cups to a work station.

7. The cup drop mechanism set forth in claim 6 wherein nine of said wheels are provided, eight of said wheels being symmetrically arranged in a square, and one of said wheels being disposed in the center of said square, thereby to provide a support for a nest of four stacks of cups, the opposite supporting wheels for each stack of cups being spaced apart by less than the width of the upper edges of said cups.

8. Cup dispensing apparatus comprising a plurality of externally threaded rotatable members, means for rotating said members in synchronism, a plurality of adjacent stacks of said cups mounted above said members and having edges engaging the threaded portions of said members for individual removal from said stacks, each of said stacks being operatively associated with certain ones of said rotatable members and at least one of said members being common to a plurality of said stacks, and said rotatable members being orientated with respect to one another so that the cups are alternately removed from said stacks as said members are rotated.

9. Vending apparatus comprising a circular platform rotatably mounted opposite a delivery opening in a vending machine, a feed member mounted for reciprocal movement along a diameter of said platform, means for placing an article on said platform along the path of travel of said feed member between said feed member and the periphery of said platform, means responsive to the presence of said article on said platform for rotating said platform to an angular position at which said article is interposed between said delivery opening and said feed member, means for locking said platform in said angular position, and means operative when said platform is stopped in said angular position for moving said feed member along said platform to push said article through said opening.

10. Vending apparatus comprising a platform rotatably mounted adjacent a delivery opening in a vending machine, a feed member, drive means for reciprocally moving said feed member along said platform, supply means for placing an article on said platform along the path of movement of said feed member behind said feed member as it is moved in a first direction relative to said platform toward said opening, means for rotating said platform until said article is interposed between said feed member and said opening, and means for causing said drive means to move said feed member in a second direction relative to said platform and toward said opening to feed said article through said opening, said supply means being operative to place another article on said platform behind said feed member as said feed member feeds said first article through said opening.

11. Vending apparatus comprising a doorway through which articles to be vended are passed, a rotatably mounted article supporting platform, a feed member mounted for reciprocating movement along a surface of said platform to push articles disposed on said platform through said doorway, means for placing said articles on said platform behind said feed member as it moves in one direction over said platform toward said opening and means for rotating said platform so that as said feed member moves in the direction opposite to said one direction it again moves toward said doorway whereby said feed member feeds articles through said doorway during both directions of its travel over said platform.

12. In apparatus for vending articles, the subcombination of a delivery opening in said apparatus through which the articles to be vended are passed, and feed means including a feed member having an imperforate face portion conforming in size to said opening for pushing said articles from a platform within said apparatus through said opening and for closing said opening after said article is pushed through said opening by positioning said feed member in said opening, said feed member being reciprocally driven, and means for rotating said feed member at the end of its travel in each direction so that said feed member always moves toward said delivery opening.

13. A vending machine comprising a rotatable platform for supporting an article to be vended, a feed member reciprocally mounted on said platform for movement toward a delivery opening to feed said articles therethrough, a door fixedly mounted on said platform adjacent the path of movement of said feed member, and means for rotating and stopping said platform at a position in which said door closes over said opening after each feeding operation of said feed member.

14. In a vending machine, the combination of a doorway through which articles are dispensed, article supporting means, a feed member movable across said means toward said doorway for pushing said articles from said means through said doorway, said feed member having a leading surface conforming to said doorway, means for selectively placing an article on said supporting means between said feed member and said doorway, means for moving said feed member toward said doorway to push said article through said doorway and to close over said doorway, and door means mounted on said supporting means, said supporting means being operative upon completion of the delivery of said article through said doorway for moving said door means into said doorway to close over said doorway and prevent access to the inside of said machine therethrough.

15. In a dispensing machine of the type having a delivery opening through which an article is supplied to the user of the machine, the combination of a platform rotatably mounted in said machine opposite said opening, a feed member mounted for reciprocation across said platform along a path intersecting the axis of rotation of said platform, means for placing an article on said platform along the path of movement of said feed member, and means for rotating said platform to a delivery position, at which position said path of movement is aligned with said opening and said article is disposed between said opening and said feed member, and means responsive to said platform being in a delivery position for stopping the rotation of said platform and moving said feed member to feed said article through said opening.

16. In a vending machine, the combination of means for supporting a stack of cups, a fill station including nozzle means for supplying liquid to a cup disposed at said station, means for selectively dropping cups from said stack and placing them at said fill station, a feed station remote from said fill station, a delivery doorway at said feed station, selectively operable means for moving a filled cup from said fill station to said feed station, and means interposed between said doorway and said fill station for preventing access, at all times, to said fill station from said doorway, whereby contamination of said nozzle means is prevented.

17. The combination set forth in claim 16 which further comprises cyclically operated drive means for causing a single cycle of operation in response to the initiation of a start operation, said cycle commencing with the filling of a cup located at the fill station and terminating with the placing of an empty cup at said fill station.

References Cited in the file of this patent

UNITED STATES PATENTS

| | | |
|---|---|---|
| 1,654,004 | Lind | Dec. 27, 1927 |
| 1,670,862 | Malmquist | May 22, 1929 |
| 1,734,108 | Bergmann et al. | Nov. 5, 1929 |
| 1,865,773 | Madden | July 5, 1932 |
| 1,895,745 | Asenbaum | Jan. 31, 1933 |
| 2,556,740 | Polsen et al. | June 12, 1951 |
| 2,591,507 | Brous | Apr. 1, 1952 |
| 2,600,391 | Cabot | June 17, 1952 |
| 2,721,002 | Smith | Oct. 18, 1955 |
| 2,783,922 | Vogt | Mar. 5, 1957 |
| 2,830,627 | Polsen et al. | Apr. 15, 1958 |